United States Patent
Forutanpour et al.

(10) Patent No.: US 9,317,972 B2
(45) Date of Patent: Apr. 19, 2016

(54) USER INTERFACE FOR AUGMENTED REALITY ENABLED DEVICES

(71) Applicant: QUALCOMM Incorporated, San Diego, CA (US)

(72) Inventors: Babak Forutanpour, San Diego, CA (US); Shriram Ganesh, San Diego, CA (US); Daniel S. Baker, San Diego, CA (US); Devender A. Yamakawa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 13/718,923

(22) Filed: Dec. 18, 2012

(65) Prior Publication Data

US 2014/0168262 A1     Jun. 19, 2014

(51) Int. Cl.
*G09G 5/00* (2006.01)
*G06T 19/00* (2011.01)

(52) U.S. Cl.
CPC .................................. *G06T 19/006* (2013.01)

(58) Field of Classification Search
None
See application file for complete search history.

(56) References Cited

U.S. PATENT DOCUMENTS

| | | |
|---|---|---|
| 2006/0026628 A1 | 2/2006 | Wan et al. |
| 2008/0218641 A1* | 9/2008 | Kjeldsen et al. ............... 348/746 |
| 2009/0189974 A1 | 7/2009 | Deering |
| 2010/0208033 A1 | 8/2010 | Edge et al. |
| 2011/0205242 A1 | 8/2011 | Friesen |
| 2011/0234879 A1 | 9/2011 | Kashitani |
| 2012/0154557 A1* | 6/2012 | Perez et al. ...................... 348/53 |
| 2012/0218301 A1 | 8/2012 | Miller |
| 2012/0249741 A1 | 10/2012 | Maciocci et al. |
| 2013/0044128 A1* | 2/2013 | Liu et al. ........................ 345/633 |

FOREIGN PATENT DOCUMENTS

| | | |
|---|---|---|
| CN | 1728781 A | 2/2006 |
| CN | 102566756 A | 7/2012 |

OTHER PUBLICATIONS

Borkowski S., et al., "Spatial Control of Interactive Surfaces in an Augmented Environment", Jun. 30, 2005, Engineering Human Computer Interaction and Interactive Systems; [Lecture Notes in Computer Science;;LNCS], Springer-Verlag, Berlin/Heidelberg, pp. 228-244, XP019009962, ISBN: 978-3-540-26097-4.

(Continued)

*Primary Examiner* — Xiao Wu
*Assistant Examiner* — Mohammad H Akhavannik
(74) *Attorney, Agent, or Firm* — Silicon Valley Patent Group LLP

(57) ABSTRACT

Method and apparatus for displaying augmented reality contents are disclosed. The method may include controlling a camera to scan an environment in view of a user, identifying a set of surfaces in the environment for displaying user interface windows according to characteristics of the environment, prioritizing a set of augmented reality contents for display with respect to the set of surfaces in the environment, and displaying the set of augmented reality contents on the set of surfaces in a display. Characteristics of the environment comprise at least aspect ratio of the set of surfaces with respect to the set of augmented reality contents to be displayed, and/or background color of the set of surfaces with respect to the set of augmented reality contents to be displayed.

44 Claims, 7 Drawing Sheets

(56) References Cited

OTHER PUBLICATIONS

Bostanci E., et al., "Tracking Methods for Augmented Reality," The 3rd International Conference on Machine Vision (ICMV 2010), 2010, pp. 425-429.
Partial International Search Report—PCT/US2013/071044—ISA/EPO—May 13, 2014.
Rosten E., et al., "Real-Time Video Annotations for Augmented Reality," ISVC 2005: pp. 294-302.
Ventura J., et al., "Real-time Planar World Modeling for Augmented Reality", Oct. 13, 2010, XP055113628, pp. 1-4, Retrieved from the Internet: URL:http://www.cs.ucsb.edurholl/pubs/Vent ura-2010-ARSuperModels.pdf.
International Search Report and Written Opinion—PCT/US2013/071044—ISA/EPO—Aug. 8, 2014.
Taiwan Search Report—TW102144483—TIPO—Mar. 25, 2015.

* cited by examiner

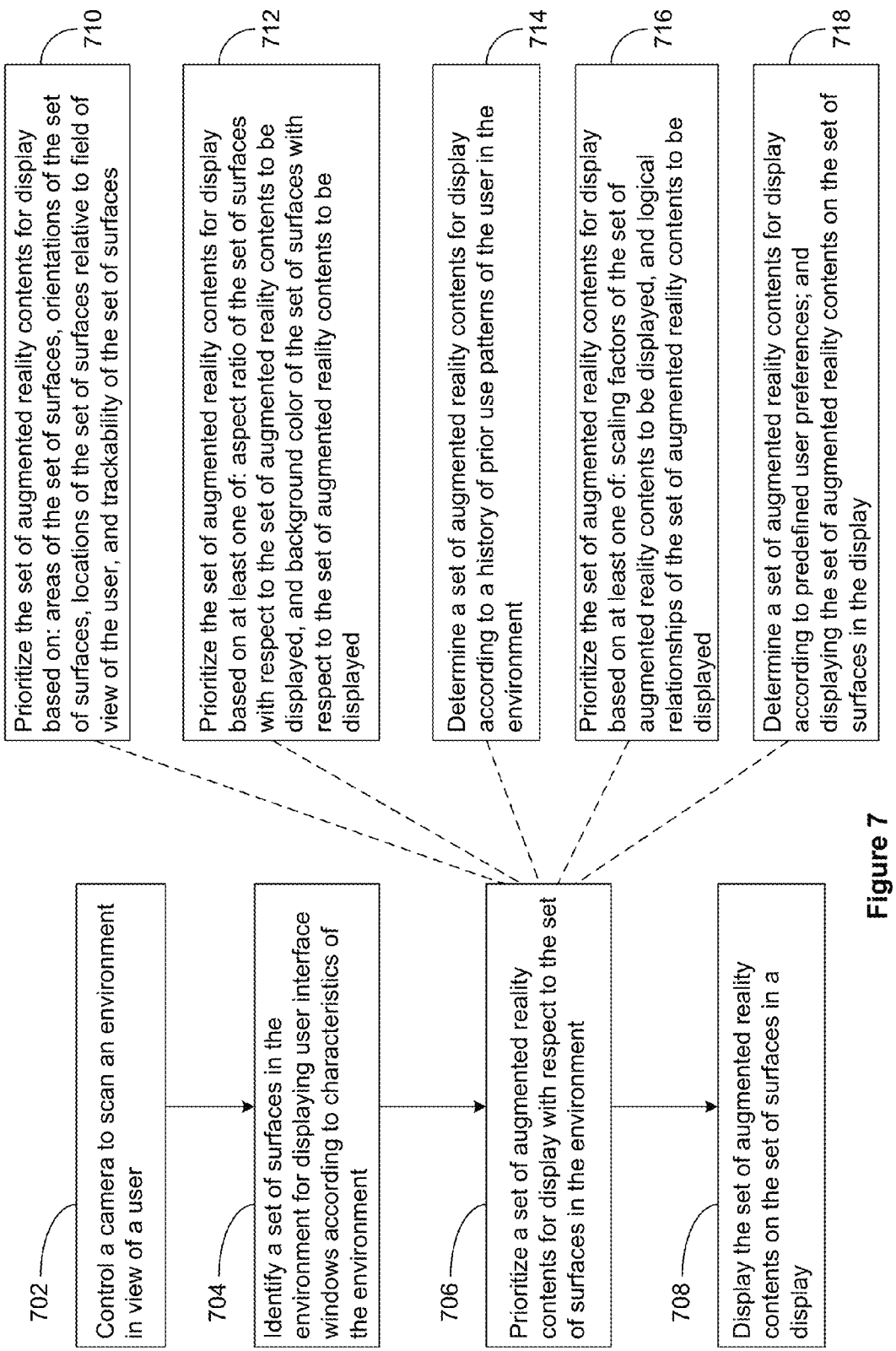

United States Patent

USER INTERFACE FOR AUGMENTED REALITY ENABLED DEVICES

FIELD

The present disclosure relates to the field of augmented reality. In particular, the present disclosure relates to user interface for augmented reality enabled devices.

BACKGROUND

Head mounted displays may be configured to allow users to see the world in front of them, while still able to read their email, get stock quotes, etc. However, a common issue with existing devices is that they can lead to information overload as the user has to view the real world, and also has to change focus to view the AR content. Another issue with existing devices is that they do not prioritize and organize the available areas in view of the user based on the contents to be displayed. FIG. 1 illustrates an example of information displayed according to certain conventional applications. As shown in FIG. 1, various advertisements are placed on the screen of a display. Some of the advertisements, for example 152, 154, and 156 may have blocked certain parts of the scene from the user. Thus, the conventional applications have not effectively integrated augmented reality contents into the environment while enabling users to interact with their surrounding naturally, which may adversely impact users' experience with the head mounted displays.

Therefore, there is a need for methods and devices that can address the above issues of conventional solutions.

SUMMARY

The present disclosure relates to user interface for augmented reality enabled devices. According to embodiments of the present disclosure, a method of displaying augmented reality contents comprises controlling a camera to scan an environment in view of a user, identifying a set of surfaces in the environment for displaying user interface windows according to characteristics of the environment, prioritizing a set of augmented reality contents for display with respect to the set of surfaces in the environment, and displaying the set of augmented reality contents on the set of surfaces in a display. Characteristics of the environment comprise at least aspect ratio of the set of surfaces with respect to the set of augmented reality contents to be displayed, and/or background color of the set of surfaces with respect to the set of augmented reality contents to be displayed.

In some implementations, the method of prioritizing a set of augmented reality contents for display with respect to the set of surfaces in the environment comprises prioritizing the set of augmented reality contents for display based on: areas of the set of surfaces, orientations of the set of surfaces, locations of the set of surfaces relative to field of view of the user, and trackability of the set of surfaces.

In some other implementations, the method of prioritizing a set of augmented reality contents for display with respect to the set of surfaces in the environment further comprises prioritizing the set of augmented reality contents for display based on at least one of: aspect ratio of the set of surfaces with respect to the set of augmented reality contents to be displayed, and background color of the set of surfaces with respect to the set of augmented reality contents to be displayed.

In yet some other implementations, the method of prioritizing a set of augmented reality contents for display with respect to the set of surfaces in the environment further comprises determining a set of augmented reality contents for display according to a history of prior use patterns of the user in the environment. The method of determining a set of augmented reality contents for display comprises at least one of: selecting a first set of augmented reality contents for display in response to a determination of the user being at work; selecting a second set of augmented reality contents for display in response to a determination of the user being at home; selecting a third set of augmented reality contents for display in response to a determination of the user being in a business meeting; and selecting a fourth set of augmented reality contents for display in response to a determination of the user being in a social event.

Note that the first set of augmented reality contents includes application programs for communication and documentation the user is accustomed to use at work, and the second set of augmented reality contents includes application programs for communication and entertainment the user is accustomed to use at home. The first set of augmented reality contents for communication and documentation includes email, web browser, and office productivity applications, and the second set of augmented reality contents for communication and entertainment includes Facebook, Twitter, movie and video game applications.

In yet some other implementations, the method of prioritizing a set of augmented reality contents for display with respect to the set of surfaces in the environment further comprises prioritizing the set of augmented reality contents for display based on at least one of: scaling factors of the set of augmented reality contents to be displayed, and logical relationships of the set of augmented reality contents to be displayed.

In yet some other implementations, the method of prioritizing a set of augmented reality contents for display with respect to the set of surfaces in the environment further comprises determining a set of augmented reality contents for display according to predefined user preferences; and displaying the set of augmented reality contents on the set of surfaces in the display. The predefined user preferences comprise at least one of: importance of an augmented reality content to the user; amount of the augmented reality content to be displayed; and viewing orientation of the augmented reality content with respect to the set of surfaces.

In another embodiment, a computer program product comprises a non-transitory medium storing computer programs for execution by one or more computer systems; the computer program product comprises code for controlling a camera to scan an environment in view of a user; code for identifying a set of surfaces in the environment for displaying user interface windows according to characteristics of the environment; code for prioritizing a set of augmented reality contents for display with respect to the set of surfaces in the environment; code for displaying the set of augmented reality contents on the set of surfaces in a display.

In yet another embodiment, an apparatus comprises at least one processor, where the at least one processor comprises logic configured to control a camera to scan an environment in view of a user, logic configured to identify a set of surfaces in the environment for displaying user interface windows according to characteristics of the environment, logic configured to prioritize a set of augmented reality contents for display with respect to the set of surfaces in the environment, and logic configured to display the set of augmented reality contents on the set of surfaces in a display.

In yet another embodiment, a system for displaying augmented reality contents comprises means for controlling a camera to scan an environment in view of a user, means for identifying a set of surfaces in the environment for displaying user interface windows according to characteristics of the environment, means for prioritizing a set of augmented reality contents for display with respect to the set of surfaces in the environment, and means for displaying the set of augmented reality contents on the set of surfaces in a display.

BRIEF DESCRIPTION OF THE DRAWINGS

The aforementioned features and advantages of the disclosure, as well as additional features and advantages thereof, will be more clearly understandable after reading detailed descriptions of embodiments of the disclosure in conjunction with the following drawings.

FIG. 7 illustrates an exemplary method of displaying augmented reality contents according to some aspects of the present disclosure.

DESCRIPTION OF EMBODIMENTS

Embodiments of user interface for augmented reality enabled devices are disclosed. The following descriptions are presented to enable any person skilled in the art to make and use the disclosure. Descriptions of specific embodiments and applications are provided only as examples. Various modifications and combinations of the examples described herein will be readily apparent to those skilled in the art, and the general principles defined herein may be applied to other examples and applications without departing from the spirit and scope of the disclosure. Thus, the present disclosure is not intended to be limited to the examples described and shown, but is to be accorded the widest scope consistent with the principles and features disclosed herein. The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
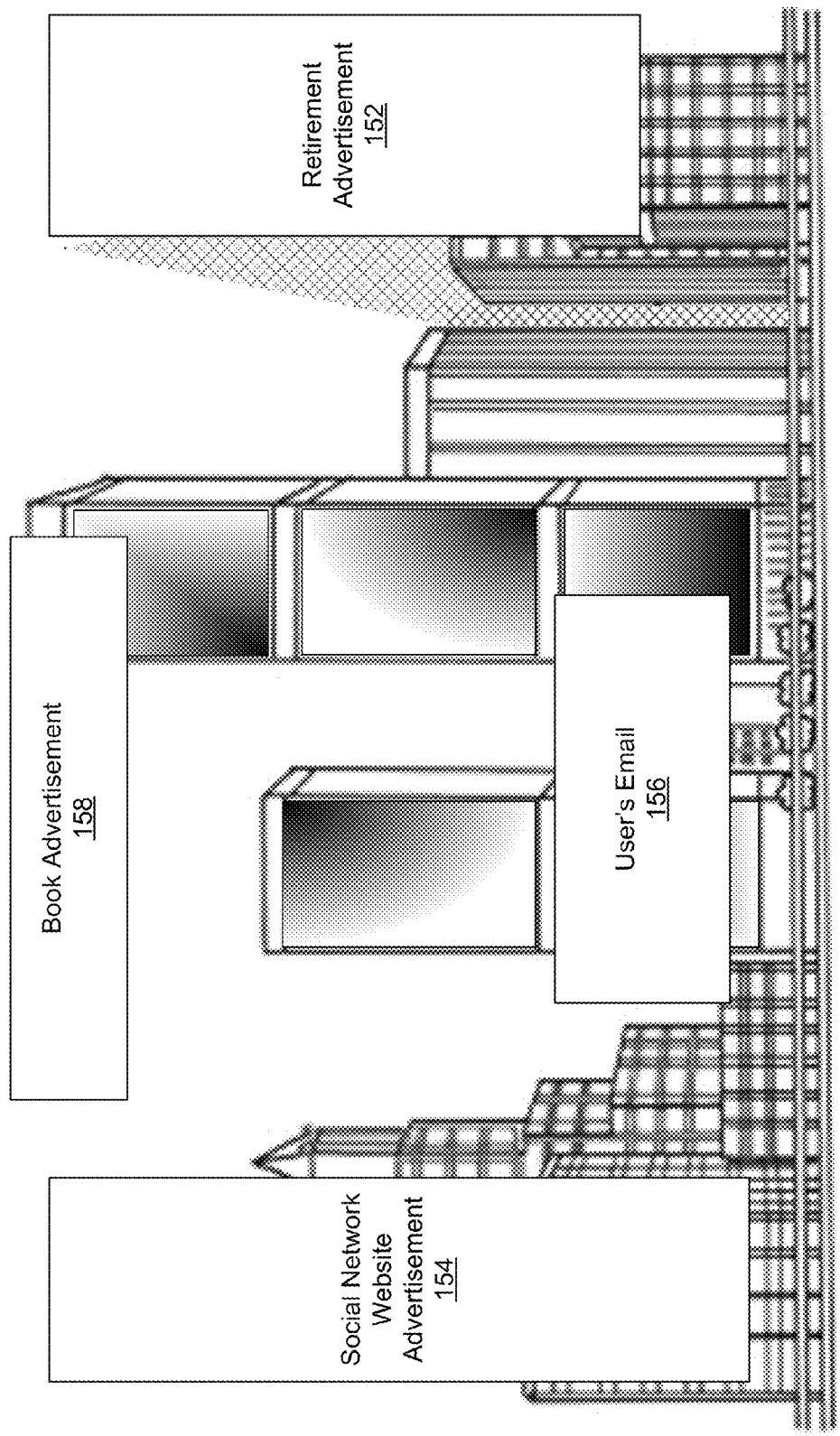
FIG. 1 illustrates an example of information displayed according to certain conventional applications.
Figure 2:
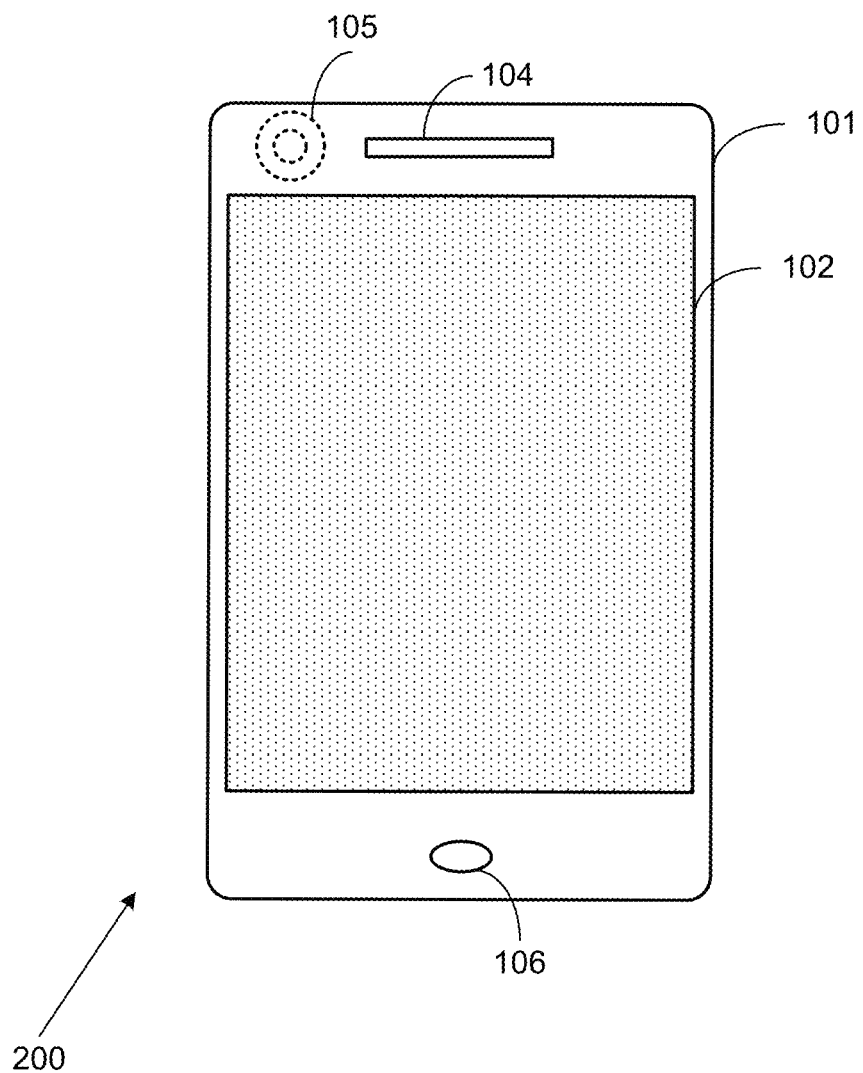
FIG. 2 illustrates an augmented reality enabled device according to some aspects of the present disclosure.

FIG. 2 illustrates an augmented reality enabled device according to some aspects of the present disclosure. As shown in FIG. 2, the augmented reality enabled device (ARD) 200 includes housing 101, display 102, one or more speakers 104, and microphone 106. The display 102, which may be a touch screen display, may illustrate images captured by the camera 105, or any other desired user interface information. Of course, the ARD 200 may include additional components that are not necessarily related to the present disclosure.

As used herein, an ARD device refers to any portable electronic device such as a cellular or other wireless communication device, personal communication system (PCS) device, personal navigation device (PND), Personal Information Manager (PIM), Personal Digital Assistant (PDA), laptop or other suitable mobile platform. The mobile platform may be capable of receiving wireless communication and/or navigation signals, such as navigation positioning signals. The term ARD is also intended to include devices which communicate with a personal navigation device (PND), such as by short-range wireless, infrared, wireline connection, or other connection, regardless of whether satellite signal reception, assistance data reception, and/or position-related processing occurs at the device or at the PND. Also, ARD is intended to include all electronic devices, including wireless communication devices, computers, laptops, tablet computers, smart phones, digital cameras etc. which are capable of capturing images used in pose tracking, as well as capable of performing augmented reality user interface functions.

Figure 3:
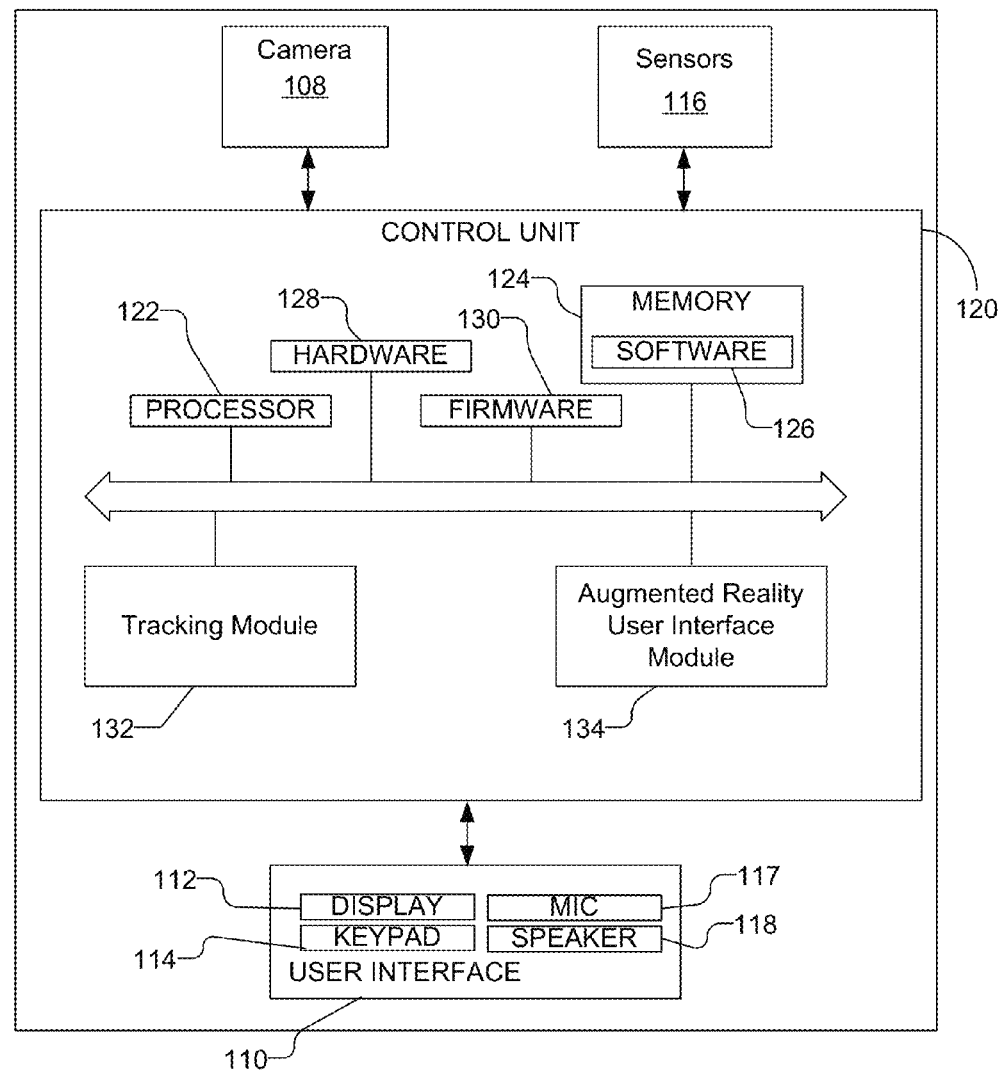
FIG. 3 illustrates a block diagram of an exemplary augmented reality enabled device according to some aspects of the present disclosure.

FIG. 3 illustrates a block diagram of an exemplary augmented reality enabled device according to some aspects of the present disclosure. The mobile platform of the ARD 300 includes a camera 108 for capturing images of the environment, which may be either individual photos or frames of video. The mobile platform of the ARD 300 may also include sensors 116, which may be used to provide data with which the mobile platform of the ARD 300 can determine its position and orientation, i.e., pose. Examples of sensors that may be used with the mobile platform of the ARD 300 include accelerometers, quartz sensors, gyros, micro-electromechanical system (MEMS) sensors used as linear accelerometers, as well as magnetometers.

The mobile platform of the ARD 300 may also include a user interface 110 that includes display 112 capable of displaying images. The user interface 110 may also include a keypad 114 or other input device through which the user can input information into the mobile platform of the ARD 300. If desired, the keypad 114 may be obviated by integrating a virtual keypad into the display 112 with a touch sensor. The user interface 110 may also include a microphone 117 and one or more speakers 118, for example, if the mobile platform is a cellular telephone. Of course, mobile platform of the ARD 300 may include other components unrelated to the present disclosure.

The mobile platform of the ARD 300 further includes a control unit 120 that is connected to and communicates with the camera 108 and sensors 116, as well as the user interface 110, along with any other desired features. The control unit 120 may be provided by one or more processors 122 and associated memory/storage 124. The control unit 120 may also include software 126, as well as hardware 128, and firmware 130. The control unit 120 includes a tracking module 132 configured to track the position of the ARD 300 as well as to track positions of one or more objects monitored by the ARD 300. The control unit 120 further includes augmented reality user interface module 134 configured to present augmented reality interactions on the display 112 of the ARD 300. The tracking module 132 and augmented reality user interface module 134 are illustrated separately from processor 122 and/or hardware 128 for clarity, but may be combined and/or implemented in the processor 122 and/or hardware 128 based on instructions in the software 126 and the firmware 130.

Figure 4:
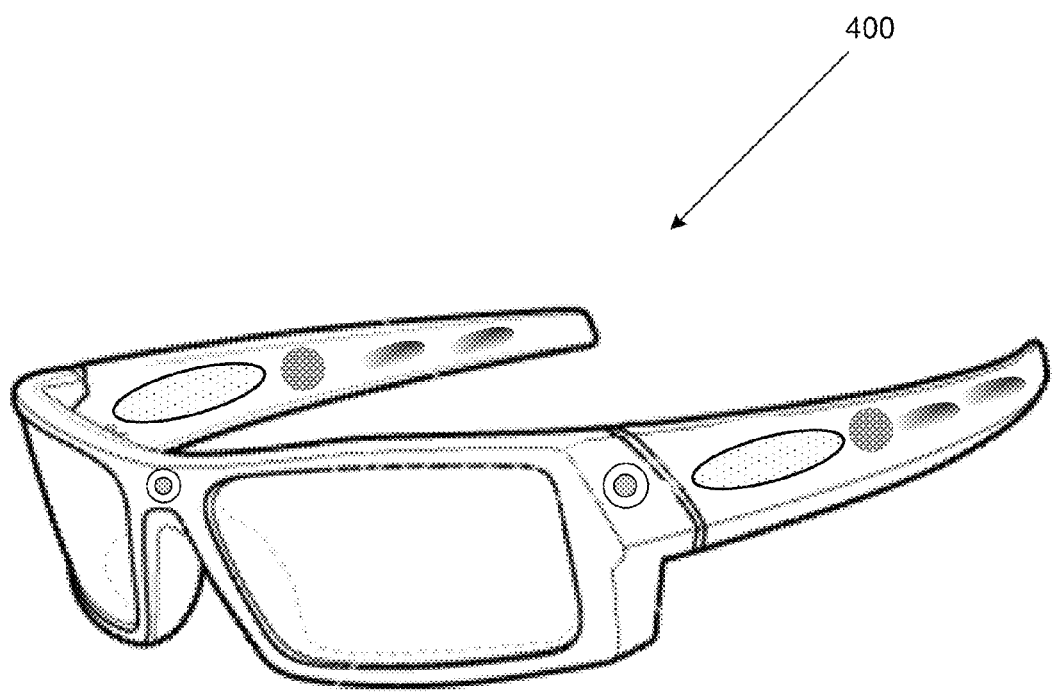
FIG. 4 illustrates another exemplary augmented reality enabled device according to some aspects of the present disclosure.

FIG. 4 illustrates another exemplary augmented reality enabled device 400 according to some aspects of the present disclosure. As shown in FIG. 4, the augmented reality enabled device 400 may be a head mounted device. According to aspects of the present disclosure, the head mounted device may be configured to learn patterns of usage and preferences of a user over time and automatically adapt the user interface windows based on the time and environment the user may be in. For example, the head mounted device may be configured to determine a set of augmented reality contents for display according to a history of prior use patterns of the user in certain environment, and then display the set of augmented reality contents accordingly.

In one approach, the head mounted device may be configured to select a first set of augmented reality contents for display in response to a determination of the user being at work. In another approach, the head mounted device may be configured to select a second set of augmented reality contents for display in response to a determination of the user being at home. In yet another approach, the head mounted device may be configured to select a third set of augmented reality contents for display in response to a determination of the user being in a business meeting. In yet another approach, the head mounted device may be configured to select a fourth set of augmented reality contents for display in response to a determination of the user being in a social event.

According to aspects of the present disclosure, the first set of augmented reality contents may include application programs for communication and documentation the user is accustomed to use at work, and the second set of augmented reality contents may include application programs for communication and entertainment the user is accustomed to use at home. The first set of augmented reality contents for communication and documentation may include email, web browser, and office productivity applications, and the second set of augmented reality contents for communication and entertainment may include Facebook, Twitter, movie and video game applications.

Figure 5:
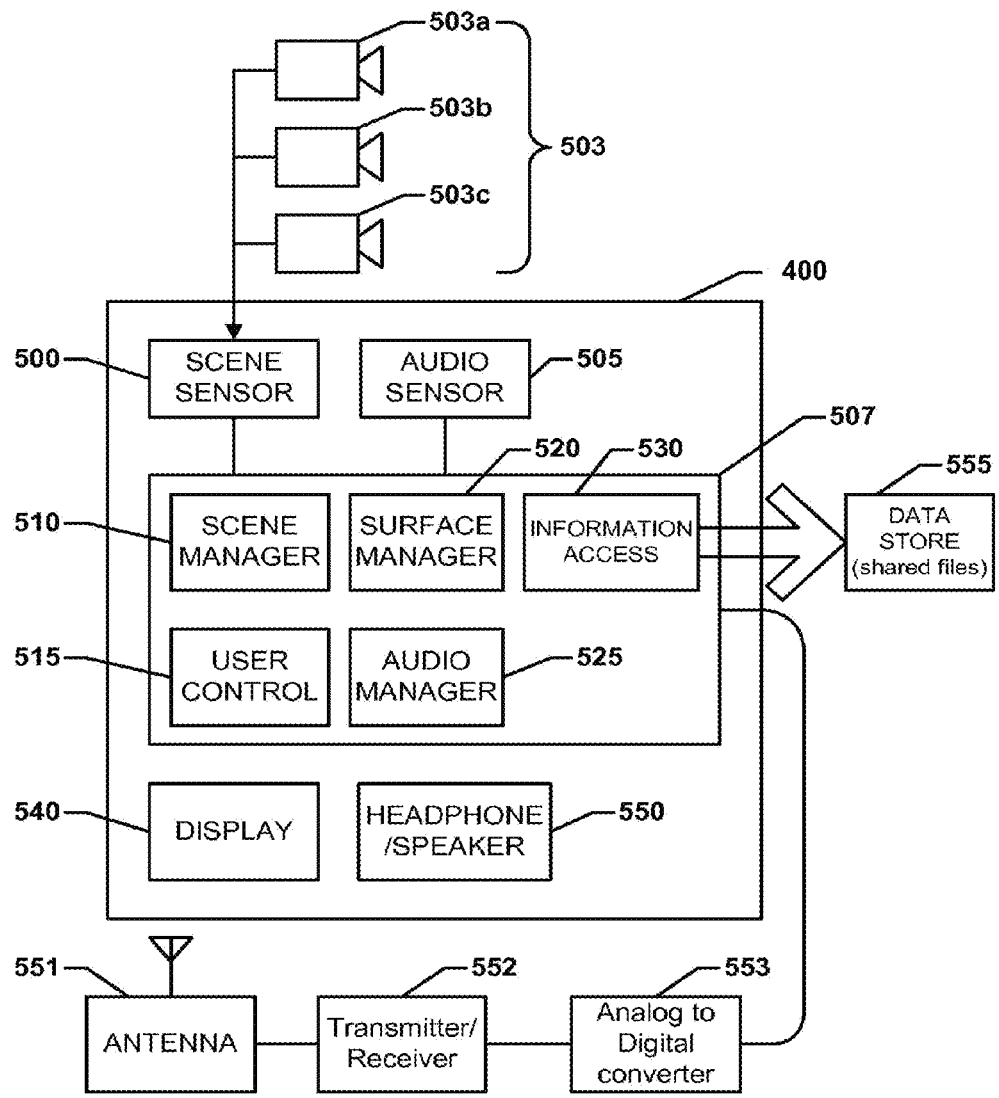
FIG. 5 illustrates a block diagram of the augmented reality enabled device of FIG. 4 according to some aspects of the present disclosure.

FIG. 5 illustrates a block diagram of the augmented reality enabled device of FIG. 4 according to some aspects of the present disclosure. In some implementations, the head mounted device 400 may operate as part of a system in which a sensor array 500 may provide data to a processor 507 that performs operations of the various embodiments described herein, and communicates data to and receives data from a server. Note that the processor 507 of head mounted device 400 may include more than one processor (or a multi-core processor) in which a core processor may perform overall control functions while a coprocessor executes applications, sometimes referred to as an application processor. The core processor and applications processor may be configured in the same microchip package, such as a multi-core processor, or in separate chips. Also, the processor 507 may be packaged within the same microchip package with processors associated with other functions, such as wireless communications (i.e., a modem processor), navigation (e.g., a processor within a GPS receiver), and graphics processing (e.g., a graphics processing unit or "GPU").

The head mounted device 400 may communicate with a communication system or network that may include other computing devices, such as personal computers and mobile devices with access to the Internet. Such personal computers and mobile devices may include an antenna 551, a transmitter/receiver or transceiver 552 and an analog to digital converter 553 coupled to a processor 507 to enable the processor to send and receive data via a wireless communication network. For example, mobile devices, such as cellular telephones, may access the Internet via a wireless communication network (e.g., a Wi-Fi or cellular telephone data communication network). Such wireless communication networks may include a plurality of base stations coupled to a gateway or Internet access server coupled to the Internet. Personal computers may be coupled to the Internet in any conventional manner, such as by wired connections via an Internet gateway (not shown) or by a wireless communication network.

Referring to FIG. 5, the head mounted device 400 may include a scene sensor 500 and an audio sensor 505 coupled to a control system processor 507 which may configured with a number of modules 510-550. In an embodiment, the processor 507 or scene sensor 500 may apply an anatomical feature recognition algorithm to the images to detect one or more anatomical features. The processor 507 associated with the control system may review the detected anatomical features in order to recognize one or more gestures and process the recognized gestures as an input command. For example, as discussed in more detail below, a user may execute a movement gesture corresponding to an input command, such as pointing a finger at the virtual object to close the virtual object. In response to recognizing this example gesture, the processor 507 may remove the virtual object from the display. As another example, the user may touch the forefinger to the thumb on one hand to form the "OK" sign in order to confirm an instruction or option presented on the display.

The scene sensor 500, which may include stereo cameras, orientation sensors (e.g., accelerometers and an electronic compass) and distance sensors, may provide scene-related data (e.g., images) to a scene manager 510 implemented within the processor 507 which may be configured to interpret three-dimensional scene information. In various embodiments, the scene sensor 500 may include stereo cameras (as described below) and distance sensors, which may include infrared light emitters for illuminating the scene for an infrared camera. For example, in an embodiment illustrated in FIG. 5, the scene sensor 500 may include a stereo red-green-blue (RGB) camera 503a for gathering stereo images, and an infrared camera 503b configured to image the scene in infrared light which may be provided by a structured infrared light emitter 503c. As discussed below, the structured infrared light emitter may be configured to emit pulses of infrared light that may be imaged by the infrared camera 503b, with the time of received pixels being recorded and used to determine distances to image elements using time-of-flight calculations. Collectively, the stereo RGB camera 503a, the infrared camera 503b and the infrared emitter 503c may be referred to as an RGB-D (D for distance) camera 503.

The scene manager module 510 may scan the distance measurements and images provided by the scene sensor 500 in order to produce a three-dimensional reconstruction of the objects within the image, including distance from the stereo cameras and surface orientation information. In an embodiment, the scene sensor 500, and more particularly an RGB-D camera 503, may point in a direction aligned with the field of view of the user and the head mounted device 400. The scene sensor 500 may provide a full body three-dimensional motion capture and gesture recognition. The scene sensor 500 may have an infrared light emitter 503c combined with an infrared camera 503c, such as a monochrome CMOS sensor. The scene sensor 500 may further include stereo cameras 503a that capture three-dimensional video data. The scene sensor 500 may work in ambient light, sunlight or total darkness and may include an RGB-D camera as described herein. The scene sensor 500 may include a near-infrared (NIR) pulse illumination component, as well as an image sensor with a fast gating mechanism. Pulse signals may be collected for each pixel and correspond to locations from which the pulse may be reflected and can be used to calculate the distance to a corresponding point on the captured subject.

In another embodiment, the scene sensor 500 may use other distance measuring technologies (i.e., different types of distance sensors) to capture the distance of the objects within the image, for example, ultrasound echo-location, radar, triangulation of stereoscopic images, etc. As discussed above, in an embodiment, the scene sensor 500 may include a ranging camera, a flash light detection and ranging (LIDAR) camera, a time-of-flight (ToF) camera, and/or a RGB-D camera 503, which may determine distances to objects using at least one of range-gated ToF sensing, RF-modulated ToF sensing, pulsed-light ToF sensing, and projected-light stereo sensing. In another embodiment, the scene sensor 500 may use a stereo camera 503a to capture stereo images of a scene, and determine distance based on a brightness of the captured pixels contained within the image. As mentioned above, for consistency one or more of these types of distance measuring sensors and techniques are referred to herein generally as "distance sensors." Multiple scene sensors of differing capabilities and resolution may be present to aid in the mapping of the physical environment, accurate tracking of the user's position within the environment, and accurate tracking of the user's view of the environment.

The head mounted device 400 may also include an audio sensor 505 such as a microphone or microphone array. An audio sensor 505 enables the head mounted device 400 to record audio, and conduct acoustic source localization and ambient noise suppression. The audio sensor 505 may capture audio and convert the audio signals to audio digital data. A processor associated with the control system may review the audio digital data and apply a speech recognition algorithm to convert the data to searchable text data. The processor may also review the generated text data for certain recognized commands or keywords and use recognized commands or keywords as input commands to execute one or more tasks. For example, a user may speak a command such as "anchor virtual object" to anchor the displayed virtual object on a selected surface. For example, the user may speak "close application" to close an application displayed on the display.

The head mounted device 400 may also include a display 540. The display 540 may display images obtained by the camera within the scene sensor 500 or generated by a processor within or coupled to the head mounted device 400. In an embodiment, the display 540 may be a micro display. The display 540 may be a fully occluded display. In another embodiment, the display 540 may be a semitransparent display that can display images on a screen that the user can see through to view the surrounding of the environment. The display 540 may be configured in a monocular or stereo (i.e., binocular) configuration. Alternatively, the head mounted display 400 may be a helmet mounted display device, worn on the head, or as part of a helmet, which may have a small display 540 optic in front of one eye (monocular) or in front of both eyes (i.e., a binocular or stereo display). Alternatively, the head mounted device 400 may also include two display units 540 that are miniaturized and may be anyone or more of cathode ray tube (CRT) displays, liquid crystal displays (LCDs), liquid crystal on silicon (LCos) displays, organic light emitting diode (OLED) displays, Mirasol displays based on Interferometric Modulator (IMOD) elements which are simple micro-electro-mechanical system (MEMS) devices, light guide displays and wave guide displays, and other display technologies that exist and that may be developed. In another embodiment, the display 540 may comprise multiple micro-displays 540 to increase total overall resolution and increase a field of view.

The head mounted device 400 may also include an audio output device 550, which may be a headphone and/or speaker collectively shown as reference numeral 550 to output audio. The head mounted device 400 may also include one or more processors that can provide control functions to the head mounted device 400 as well as generate images, such as user interface windows as described below in association with FIG. 6. For example, the head mounted device 400 may include a core processor, an applications processor, a graphics processor and a navigation processor. Alternatively, the head mounted display 400 may be coupled to a separate processor, such as the processor in a smart phone or other mobile computing device. Video/audio output may be processed by the processor or by a mobile CPU, which is connected (via a wire or a wireless network) to the head mounted device 400. The head mounted device 400 may also include a scene manager block 510, a user control block 515, a surface manager block 520, an audio manager block 525 and an information access block 530, which may be separate circuit modules or implemented within the processor as software modules. The head mounted device 400 may further include a local memory and a wireless or wired interface for communicating with other devices or a local wireless or wired network in order to receive digital data from a remote memory 555. Using a remote memory 555 in the system may enable the head mounted device 400 to be made more lightweight by reducing memory chips and circuit boards in the device.

The scene manager block 510 of the controller may receive data from the scene sensor 500 and construct the virtual representation of the physical environment. For example, a laser may be used to emit laser light that is reflected from objects in a room and captured in a camera, with the round trip time of the light used to calculate distances to various objects and surfaces in the room. Such distance measurements may be used to determine the location, size and shape of objects in the room and to generate a map of the scene. After a map is formulated, the scene manager block 510 may link the map to other generated maps to form a larger map of a predetermined area. In an embodiment, the scene and distance data may be transmitted to a server or other computing device which may generate an amalgamated or integrated map based on the image, distance and map data received from a number of head mounted devices (and over time as the user moved about within the scene). Such an integrated map data made available via wireless data links to the head mounted device processors. The other maps may be maps scanned by the instant device or by other head mounted devices, or may be received from a cloud service. The scene manager 510 may identify surfaces and track the current position of the user based on data from the scene sensors 500. The user control block 515 may gather user control inputs to the system, for example audio commands, gestures, and input devices (e.g., keyboard, mouse). In an embodiment, the user control block 515 may include or be configured to access a gesture dictionary to interpret user body part movements identified by the scene manager 510. Note that a gesture dictionary may store movement data or patterns for recognizing gestures that may include pokes, pats, taps, pushes, guiding, flicks, turning, rotating, grabbing and pulling, two hands with palms open for panning images, drawing (e.g., finger painting), forming shapes with fingers (e.g., an "OK" sign), and swipes, all of which may be accomplished on or in close proximity to the apparent location of a virtual object in a generated display. The user control block 515 may also recognize compound commands. This may include two or more commands. For example, a gesture and a sound (e.g. clapping) or a voice control command (e.g. "OK" detected hand gesture made and combined with a voice command or a spoken word to confirm an operation). When a user control 515 is identified, the controller may provide a request to another subcomponent of the head mounted device 400.

The head mounted device 400 may also include a surface manager block 520. The surface manager block 520 may continuously track the positions of surfaces within the scene based on captured images (as managed by the scene manager block 510) and measurements from distance sensors. The surface manager block 520 may also continuously update positions of the virtual objects that may be anchored on surfaces within the captured image. The surface manager block 520 may be responsible for active surfaces and user interface windows. The audio manager block 525 may provide control instructions for audio input and audio output. The audio manager block 525 may construct an audio stream delivered to the headphones and speakers 550.

The information access block 530 may provide control instructions to mediate access to the digital information. Data may be stored on a local memory storage medium on the head mounted device 400. Data may also be stored on a remote data storage medium 555 on accessible digital devices, or data may be stored on a distributed cloud storage memory, which is accessible by the head mounted device 400. The information access block 530 communicates with a data store 555, which may be a memory, a disk, a remote memory, a cloud computing resource, or an integrated memory 555.

Figure 6:
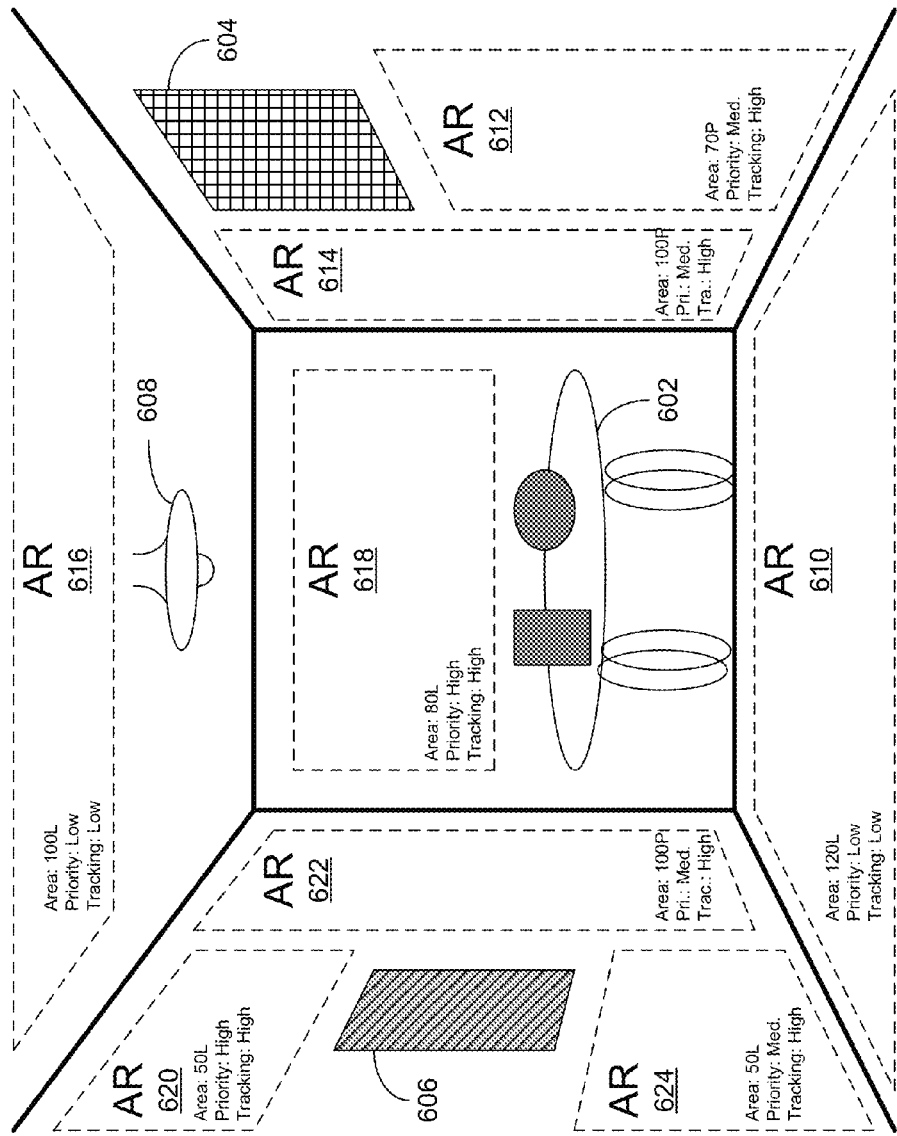
FIG. 6 illustrates an exemplary user interface for an augmented reality enabled device according to some aspects of the present disclosure.

FIG. 6 illustrates an exemplary user interface for an augmented reality enabled device according to some aspects of the present disclosure. As shown in FIG. 6, the user interface can be configured to effectively fuse real world objects and AR contents. In one exemplary implementation, the ARD scans an environment using a front facing camera. In one approach, the Qualcomm Vuforia™ computer vision application may be used to detect flat surfaces. As shown in FIG. 6, the flat surfaces may include surfaces in top, bottom, left, right, and front view of the user, and the environment may include real world objects, such as table 602, window 604, painting 606, and lamp 608. User interface windows, for example 610, 612, 614, 616, 618, 620, 622, and 624 may then be placed to the flat surfaces for displaying augmented reality contents, such as email, PowerPoint presentations, Facebook, tweets, movies, etc.

In some implementations, if the number of augmented reality contents may be more than the number of user interface windows identified, the ARD may be configured to prioritize and prune the number of augmented reality contents to be displayed. In some other implementations, the ARD may be configured to merge or split the flat surfaces detected to form different sets of user interface windows to match the augmented reality contents to be displayed.

According to embodiments of the present disclosure, the ARD may be configured to prioritize the flat surfaces detected based on the following criteria, including but not limited to: a) how well features of user interface windows can be tracked; b) area/size of a surface; c) location of the surfaces relative to the user's field of view (FOV); 4) orientation and aspect ratio of the surfaces; and 5) background color of the surfaces. In some implementations, if a surface has many colors and has high frequency variations, a set of markers may be chosen such that the virtual user interface window(s) may "stick" to the surface even though the user moves his head from one view to another view. In addition, in situations when a user is conversing with a person, surfaces in the periphery may be preferred to surfaces in the center so that the user interface windows would not interfere with the user's conversation with the person. In some applications, large areas may be preferred over small areas.

In some implementations, depending on the content to be displayed, a surface having a vertical orientation may be preferred to a display a Word document, while a surface having a horizontal orientation may be preferred to display a movie. Furthermore, aspect ratio of each user interface window can be used as criteria in matching augmented reality contents to be displayed to user interface windows. For example, a long and narrow horizontal user interface window can be used to display a stock ticker, while a user interface window having approximate aspect ratio of 16:9 or 4:3 may be used to display movies.

In other implementations, background color of a surface (e.g., a wall) can be used as criteria in matching augmented reality contents to be displayed in the user interface windows. For example, a wall with gray wallpaper may be preferred over a plain white wall, as the augmented reality content displayed over a gray surface may have greater contrast than a plain white wall which reflects lights from the windows or from other light sources in the environment.

According to aspects of the present disclosure, after the surfaces to be used as backdrops have been prioritized, the user interface windows may then be characterized for display. The user interface windows are provided with attributes based on the following criteria, including but not limited to: a) importance of certain content to the user; b) the amount of contents to be displayed; and c) viewing orientation and aspect ratio of the content to be displayed.

The ARD may then assigns user interface windows to surfaces based on the criteria described above. For example, a higher priority user interface window with lots of contents may be put in a high priority surface that has a large area. The ARD may be configured to track whether a surface has been moved in the frames captured by the front facing camera because the user has moved his head, or if the actual surface (e.g., side of a bus) has been moved. This determination is made based on using one or more six degrees of freedom sensors (e.g. accelerometer, magnetometer, and gyroscope) in the ARD. For example, if the user's head has remained still while the surface has moved, then that surface may be pruned, and user interface windows may be reassigned. According to aspects of the present disclosure, in one approach, the ARD may be configured to track the available surfaces in the environment using the scale-invariant feature transform (SIFT) technique with images captured by a camera of the ARD. In another approach, the ARD may be configured to track the available surfaces in the environment using the random sample consensus (RANSAC) technique with images captured by the camera of the ARD. In yet another approach, the ARD may be configured to track the surfaces in the environment using non-visual methods, such as using radio frequency identifications (RFIDs) available in the environment.

According to some aspects of the present disclosure, virtual objects within a scene, such as on an anchor surface may be tracked and rendered continuously so that the virtual objects may appear stationary even as the user turns her head and moves about. As mentioned above, the process of orienting the ARD (e.g. a head mounted device) with respect to the surroundings, and determining distances to and relative orientation of various surfaces may be accomplished continuously by monitoring orientation sensors (e.g., accelerometers and gyroscopes) and triangulating position and angle of view of the device as it moves in space by constantly referencing shifts in the topography of the scanned three-dimensional (3D) environment, thus performing Simultaneous Location and Mapping (SLAM) operations.

Using the methods described above, as shown in FIG. 6, user interface window 610 may describe an area on the ground in landscape mode having a size of 120 square feet with relatively low priority and relatively low trackability. User interface window 612 may describe an area on the right wall in portrait mode having a size of 70 square feet with relatively medium priority and relatively high trackability. User interface window 614 may describe an area on the right wall in portrait mode having a size of 100 square feet with relatively medium priority and relatively high trackability. User interface window 616 may describe an area on the ceiling in landscape mode having a size of 100 square feet with relatively low priority and relatively low trackability. User interface window 618 may describe an area on the front wall in landscape mode having a size of 80 square feet with relatively high priority and relatively high trackability. User interface window 620 may describe an area on the left wall in landscape mode having a size of 50 square feet with relatively high priority and relatively high trackability. User interface window 622 may describe an area on the left wall in portrait mode having a size of 100 square feet with relatively medium priority and relatively high trackability. User interface window 624 may describe an area on the left wall in landscape mode having a size of 50 square feet with relatively medium priority and relatively high trackability.

After the ARD has identified flat surfaces in the environment, it may assign the AR windows to the flat surfaces, in order of their respective priorities. For example, a Word document the user was last working on his personal computer prior to his meeting may have a higher priority and may be placed on the wall in front of him in the meeting room. According to aspects of the present disclosure, the ARD may consider the size of an AR window to ensure it matches to the AR content to be displayed. For example, the size of an AR window may be enlarged if the font in a document to be displayed may be too small and hard to read. On the other hand, the size of the AR window may be reduced if the size of the AR window may be too big for the document and uncomfortable for the user's eyes. In some implementations, the ARD may apply a set of scaling factors that can be used to stretch or shrink an AR window. In one approach, a minimum scaling factor and a maximum scaling factor, such as resize_min and resize_max, may be used to adjust the size of an AR window. For example, typical values for displaying an document may range from 0.5 (50%) for resize_min and 3.0 (300%) for resize_max based on a predetermined AR window size, such as 640×480 VGA. For another example, the resize_min and resize_max for a movie to be played from an Netflix application may be 0.5 (50%) and 10.0 (1,000%) respectively, indicating the movie can be resized much larger than documents.

In some implementations, based on the size an AR window can be displayed on a given surface, determinations may be made to split a flat surface to support two or more AR windows. According to aspects of the present disclosure, a surface allocated to a first AR window may further be split into multiple AR windows if the AR contents to be displayed in the first AR window may not use the entire available surface. On the other hand, multiple AR windows may be merged to form a new AR window if the AR contents to be displayed require a larger displaying surface.

In some other implementations, the prioritization and assignment of AR contents to AR windows may be determined by the logical relationships among the AR contents to be displayed. The ARD may be configured to display multiple logically related AR contents in two or more AR windows near each other. For example, the ARD may be configured to use an AR window to display a document explaining a scientific theory and use an adjacent AR window to display a video showing a demonstration of the scientific theory. For another example, the ARD may be configured to use an AR window to display a paper to be published in a conference and use an adjacent AR window to display the presentation slides the author may use to present the paper in the conference.

With the user interface described above, users can interact with their surroundings more naturally while reading augmented reality content from the user interface windows established, because these user interface windows are not just placed in front of them. Instead, they are placed to be better fused into the natural scene in the environment according to aspects of the present disclosure. Thus, the disclosed user interface may be applied to improve efficiency and productivity for the users.

FIG. 7 illustrates an exemplary method of displaying augmented reality contents according to some aspects of the present disclosure. In block 702, the processor 122 and/or augmented reality user interface module 134 can be configured to control a camera to scan an environment in view of a user. In block 704, the processor 122 and/or augmented reality user interface module 134 can be configured to identify a set of surfaces in the environment for displaying user interface windows according to characteristics of the environment. In block 706, the processor 122 and/or augmented reality user interface module 134 can be configured to prioritize a set of augmented reality contents for display with respect to the set of surfaces in the environment. In block 708, the processor 122 and/or augmented reality user interface module 134 can be configured to display the set of augmented reality contents on the set of surfaces in a display.

According to aspects of the present disclosure, the environment comprises real world objects, and where the set of surfaces includes surfaces in top, bottom, left, right, and front view of the user, and the display is a head mounted display. The characteristics of the environment includes, but not limited to, aspect ratio of the set of surfaces with respect to the set of augmented reality contents to be displayed, and background color of the set of surfaces with respect to the set of augmented reality contents to be displayed.

According to embodiments of the present disclosure, the methods performed in block 706 may further include methods performed in blocks 710, 712, 714, 716, and 718. In block 710, the processor 122 and/or augmented reality user interface module 134 can be configured to prioritize the set of augmented reality contents for display based on: areas of the set of surfaces, orientations of the set of surfaces, locations of the set of surfaces relative to field of view of the user, and trackability of the set of surfaces.

In block 712, the processor 122 and/or augmented reality user interface module 134 can be configured to prioritize the set of augmented reality contents for display based on at least one of: aspect ratio of the set of surfaces with respect to the set of augmented reality contents to be displayed, and background color of the set of surfaces with respect to the set of augmented reality contents to be displayed.

In block 714, the processor 122 and/or augmented reality user interface module 134 can be configured to determine a set of augmented reality contents for display according to a history of prior use patterns of the user in the environment. In some implementations, the processor 122 and/or augmented reality user interface module 134 can be configured to select a first set of augmented reality contents for display in response to a determination of the user being at work, select a second set of augmented reality contents for display in response to a determination of the user being at home, select a third set of augmented reality contents for display in response to a determination of the user being in a business meeting, or select a fourth set of augmented reality contents for display in response to a determination of the user being in a social event.

In some implementations, the first set of augmented reality contents includes application programs for communication and documentation the user is accustomed to use at work, and the second set of augmented reality contents includes application programs for communication and entertainment the user is accustomed to use at home. In addition, the first set of augmented reality contents for communication and documentation includes email, web browser, and office productivity applications, and the second set of augmented reality contents for communication and entertainment includes Facebook, Twitter, movie and video game applications.

In block 716, the processor 122 and/or augmented reality user interface module 134 can be configured to prioritize the set of augmented reality contents for display based on at least one of: scaling factors of the set of augmented reality contents to be displayed, and logical relationships of the set of augmented reality contents to be displayed.

In block 718, the processor 122 and/or augmented reality user interface module 134 can be configured to determine a set of augmented reality contents for display according to predefined user preferences, and display the set of augmented reality contents on the set of surfaces in the display. Note that the predefined user preferences comprise at least one of: importance of an augmented reality content to the user, amount of the augmented reality content to be displayed, and viewing orientation of the augmented reality content with respect to the set of surfaces.

According to aspects of the present disclosure, the processor 122 and/or augmented reality user interface module 134 can be configured to identify a set of markers in the environment, associate the set of markers with the set of surfaces, and track the set of surfaces using the set of markers. According to some aspects of the present disclosure, the functions described in FIG. 7 may be implemented by the processor 122 or augmented reality user interface module 134 of FIG. 3, or by a combination of the two, potentially in combination with one or more other elements. In some implementations, the functions may be performed by processor 122, software 126, hardware 128, and firmware 130 or a combination of the above to perform various functions of the apparatus described in the present disclosure. In yet some other implementations, the functions described in FIG. 7 may be implemented by the processor 507 in combination with one or more other elements, for example elements 500-550 of FIG. 5.

Note that at least paragraphs [0066]-[0068], FIG. 3, FIG. 5, FIG. 7 and their corresponding descriptions provide means for controlling a camera to scan an environment in view of a user, means for identifying a set of surfaces in the environment for displaying user interface windows according to characteristics of the environment, means for prioritizing a set of augmented reality contents for display with respect to the set of surfaces in the environment, and means for displaying the set of augmented reality contents on the set of surfaces in a display. At least paragraphs [0066]-[0068], FIG. 3, FIG. 5, FIG. 6, FIG. 7 and their corresponding descriptions provide means for prioritizing the set of augmented reality contents for display based on: areas of the set of surfaces, orientations of the set of surfaces, locations of the set of surfaces relative to field of view of the user, and trackability of the set of surfaces; and means for prioritizing the set of augmented reality contents for display based on at least one of: aspect ratio of the set of surfaces with respect to the set of augmented reality contents to be displayed, and background color of the set of surfaces with respect to the set of augmented reality contents to be displayed; means for determining a set of augmented reality contents for display according to a history of prior use patterns of the user in the environment; means for prioritizing the set of augmented reality contents for display based on at least one of: scaling factors of the set of augmented reality contents to be displayed, and logical relationships of the set of augmented reality contents to be displayed; means for determining a set of augmented reality contents for display according to predefined user preferences; and means for displaying the set of augmented reality contents on the set of surfaces in the display.

The methodologies and mobile device described herein can be implemented by various means depending upon the application. For example, these methodologies can be implemented in hardware, firmware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. Herein, the term "control logic" encompasses logic implemented by software, hardware, firmware, or a combination.

For a firmware and/or software implementation, the methodologies can be implemented with modules (e.g., procedures, functions, and so on) that perform the functions described herein. Any machine readable medium tangibly embodying instructions can be used in implementing the methodologies described herein. For example, software codes can be stored in a memory and executed by a processing unit. Memory can be implemented within the processing unit or external to the processing unit. As used herein the term "memory" refers to any type of long term, short term, volatile, nonvolatile, or other storage devices and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media may take the form of an article of manufacturer. Computer-readable media includes physical computer storage media and/or other non-transitory media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The disclosure may be implemented in conjunction with various wireless communication networks such as a wireless wide area network (WWAN), a wireless local area network (WLAN), a wireless personal area network (WPAN), and so on. The terms "network" and "system" are often used interchangeably. The terms "position" and "location" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network and so on. A CDMA network may implement one or more radio access technologies (RATs) such as cdma2000, Wideband-CDMA (W-CDMA), and so on. Cdma2000 includes IS-95, IS2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A mobile station refers to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wire line connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, Wi-Fi, or other network, and regardless of whether satellite signal reception, assistance data reception, and/or position-related processing occurs at the device, at a server, or at another device associated with the network. Any operable combination of the above are also considered a "mobile station."

Designation that something is "optimized," "required" or other designation does not indicate that the current disclosure applies only to systems that are optimized, or systems in which the "required" elements are present (or other limitation due to other designations). These designations refer only to the particular described implementation. Of course, many implementations are possible. The techniques can be used with protocols other than those discussed herein, including protocols that are in development or to be developed.

One skilled in the relevant art will recognize that many possible modifications and combinations of the disclosed embodiments may be used, while still employing the same basic underlying mechanisms and methodologies. The foregoing description, for purposes of explanation, has been written with references to specific embodiments. However, the illustrative discussions above are not intended to be exhaustive or to limit the disclosure to the precise forms disclosed. Many modifications and variations are possible in view of the above teachings. The embodiments were chosen and described to explain the principles of the disclosure and their practical applications, and to enable others skilled in the art to best utilize the disclosure and various embodiments with various modifications as suited to the particular use contemplated.

We claim:

1. A method of displaying augmented reality contents, comprising:
   receiving, by a camera, a scan of an environment in view of a user;
   identifying a set of surfaces in the environment for displaying user interface windows;
   assigning a surface priority level to each surface in the set of surfaces, wherein the surface priority level for each surface is selected from a plurality of surface priority levels;
   assigning a surface trackability level to each surface in the set of surfaces, wherein the surface trackability level for each surface is selected from a plurality of surface trackability levels;
   assigning a content priority level to each content item in a set of augmented reality contents for display with respect to the set of surfaces in the environment, wherein the content priority level for each content item is selected from a plurality of content priority levels; and
   displaying each content item in the set of augmented reality contents for display on a surface in the set of surfaces in a display based on the surface priority level, the surface trackability level, and the content priority level.

2. The method of claim 1, wherein the environment comprises real world objects, and wherein the set of surfaces includes surfaces in top, bottom, left, right, and front view of the user; and wherein the display is a head mounted display.

3. The method of claim 1, wherein assigning the surface priority level to each surface in the set of surfaces comprises:
   assigning the surface priority level based on: areas of the set of surfaces, orientations of the set of surfaces, and locations of the set of surfaces relative to field of view of the user, wherein the plurality of surface priority levels include high, medium and low surface priority levels.

4. The method of claim 1, wherein assigning the content priority level to each content item in a set of augmented reality contents for display with respect to the set of surfaces in the environment comprises:
   assigning the content priority level based on at least one of: aspect ratio of the set of surfaces with respect to the set of augmented reality contents to be displayed, and background color of the set of surfaces with respect to the set of augmented reality contents to be displayed.

5. The method of claim 1, wherein assigning the content priority level to each content item in a set of augmented reality contents for display with respect to the set of surfaces in the environment comprises:
   assigning the content priority level based on a history of prior use patterns of the user in the environment.

6. The method of claim 5, wherein assigning the content priority level based on a history of prior use patterns of the user in the environment comprises at least one of:

selecting a first set of augmented reality contents for display in response to a determination of the user being at work;
selecting a second set of augmented reality contents for display in response to a determination of the user being at home;
selecting a third set of augmented reality contents for display in response to a determination of the user being in a business meeting; and
selecting a fourth set of augmented reality contents for display in response to a determination of the user being in a social event.

7. The method of claim 6, wherein
the first set of augmented reality contents includes application programs for communication and documentation the user is accustomed to use at work; and
the second set of augmented reality contents includes application programs for communication and entertainment the user is accustomed to use at home.

8. The method of claim 7, wherein
the first set of augmented reality contents for communication and documentation includes email, web browser, and office productivity applications; and
the second set of augmented reality contents for communication and entertainment includes social networking websites, movie and video game applications.

9. The method of claim 1, wherein assigning the content priority level to each content item in a set of augmented reality contents for display with respect to the set of surfaces in the environment comprises:
assigning the content priority level based on at least one of: scaling factors of the set of augmented reality contents to be displayed, and logical relationships of the set of augmented reality contents to be displayed.

10. The method of claim 9, wherein the logical relationships of the set of augmented reality contents to be displayed comprises:
a document and a corresponding video presentation of the document.

11. The method of claim 9, wherein the logical relationships of the set of augmented reality contents to be displayed comprises:
a document and corresponding presentation slides of the document.

12. The method of claim 1, wherein assigning the content priority level to each content item in a set of augmented reality contents for display with respect to the set of surfaces in the environment comprises:
assigning the content priority level based on predefined user preferences.

13. The method of claim 12, wherein the predefined user preferences comprise at least one of:
importance of an augmented reality content to the user;
amount of the augmented reality content to be displayed; and
viewing orientation of the augmented reality content with respect to the set of surfaces.

14. The method of claim 1, further comprising:
identifying a set of markers in the environment;
associating the set of markers with the set of surfaces; and
tracking the set of surfaces using the set of markers.

15. A computer program product comprising a non-transitory medium storing computer programs for execution by one or more computer systems, the computer program product comprising:
code for receiving, by a camera, a scan of an environment in view of a user;
code for identifying a set of surfaces in the environment for displaying user interface windows;
code for assigning a surface priority level to each surface in the set of surfaces, wherein the surface priority level for each surface is selected from a plurality of surface priority levels;
code for assigning a surface trackability level to each surface in the set of surfaces, wherein the surface trackability level for each surface is selected from a plurality of surface trackability levels;
code for assigning a content priority level to each content item in a set of augmented reality contents for display with respect to the set of surfaces in the environment, wherein the content priority level for each content item is selected from a plurality of content priority levels; and
code for displaying each content item in the set of augmented reality contents for display on a surface in the set of surfaces in a display based on the surface priority level, the surface trackability level, and the content priority level.

16. The computer program product of claim 15, wherein the environment comprises real world objects, and wherein the set of surfaces includes surfaces in top, bottom, left, right, and front view of the user; and wherein the display is a head mounted display.

17. The computer program product of claim 15, wherein code for assigning the surface priority level to each surface in the set of surfaces comprises:
code for assigning the surface priority level based on: areas of the set of surfaces, orientations of the set of surfaces, and locations of the set of surfaces relative to field of view of the user, wherein the plurality of surface priority levels include high, medium and low surface priority levels.

18. The computer program product of claim 15, wherein code for assigning the content priority level to each content item in a set of augmented reality contents for display with respect to the set of surfaces in the environment comprises:
code for assigning the content priority level based on at least one of: aspect ratio of the set of surfaces with respect to the set of augmented reality contents to be displayed, and background color of the set of surfaces with respect to the set of augmented reality contents to be displayed.

19. The computer program product of claim 15, wherein code for assigning the content priority level to each content item in a set of augmented reality contents for display with respect to the set of surfaces in the environment comprises:
code for assigning the content priority level based on a history of prior use patterns of the user in the environment.

20. The computer program product of claim 19, wherein code for assigning the content priority level based on a history of prior use patterns of the user in the environment comprises at least one of:
code for selecting a first set of augmented reality contents for display in response to a determination of the user being at work;
code for selecting a second set of augmented reality contents for display in response to a determination of the user being at home;
code for selecting a third set of augmented reality contents for display in response to a determination of the user being in a business meeting; and
code for selecting a fourth set of augmented reality contents for display in response to a determination of the user being in a social event.

21. The computer program product of claim 20, wherein
the first set of augmented reality contents includes application programs for communication and documentation the user is accustomed to use at work; and
the second set of augmented reality contents includes application programs for communication and entertainment the user is accustomed to use at home.

22. The computer program product of claim 21, wherein
the first set of augmented reality contents for communication and documentation includes email, web browser, and office productivity applications; and
the second set of augmented reality contents for communication and entertainment includes social networking websites, movie and video game applications.

23. The computer program product of claim 15, wherein code for assigning the content priority level to each content item in a set of augmented reality contents for display with respect to the set of surfaces in the environment comprises:
code for assigning the content priority level based on at least one of: scaling factors of the set of augmented reality contents to be displayed, and logical relationships of the set of augmented reality contents to be displayed.

24. The computer program product of claim 15, wherein code for assigning the content priority level to each content item in a set of augmented reality contents for display with respect to the set of surfaces in the environment comprises:
code for assigning the content priority level based on code for determining a set of augmented reality contents for display according to predefined user preferences.

25. The computer program product of claim 24, wherein the predefined user preferences comprise at least one of:
importance of an augmented reality content to the user;
amount of the augmented reality content to be displayed; and
viewing orientation of the augmented reality content with respect to the set of surfaces.

26. The computer program product of claim 15, further comprising:
code for identifying a set of markers in the environment;
code for associating the set of markers with the set of surfaces; and
code for tracking the set of surfaces using the set of markers.

27. An apparatus, comprising:
at least one processor, wherein the at least one processor comprises
logic configured to receive, by a camera, a scan of an environment in view of a user;
logic configured to identify a set of surfaces in the environment for displaying user interface windows;
logic configured to assign a surface priority level to each surface in the set of surfaces, wherein the surface priority level for each surface is selected from a plurality of surface priority levels;
logic configured to assign a surface trackability level to each surface in the set of surfaces, wherein the surface trackability level for each surface is selected from a plurality of surface trackability levels;
logic configured to assign a content priority level to each content item in a set of augmented reality contents for display with respect to the set of surfaces in the environment, wherein the content priority level for each content item is selected from a plurality of content priority levels; and
logic configured to display each content item in the set of augmented reality contents for display on a surface in the set of surfaces in a display based on the surface priority level, the surface trackability level, and the content priority level.

28. The apparatus of claim 27, wherein the environment comprises real world objects, and wherein the set of surfaces includes surfaces in top, bottom, left, right, and front view of the user; and wherein the display is a head mounted display.

29. The apparatus of claim 27, wherein logic configured to assign the surface priority level to each surface in the set of surfaces comprises:
logic configured to assign the surface priority level based on: areas of the set of surfaces, orientations of the set of surfaces, and locations of the set of surfaces relative to field of view of the user, wherein the plurality of surface priority levels include high, medium and low surface priority levels.

30. The apparatus of claim 27, wherein logic configured to assign the content priority level to each content item in a set of augmented reality contents for display with respect to the set of surfaces in the environment comprise:
logic configured to assign the content priority level based on at least one of: aspect ratio of the set of surfaces with respect to the set of augmented reality contents to be displayed, and background color of the set of surfaces with respect to the set of augmented reality contents to be displayed.

31. The apparatus of claim 27, wherein logic configured to assign the content priority level to each content item in a set of augmented reality contents for display with respect to the set of surfaces in the environment comprises:
logic configured to assign the content priority level based on a history of prior use patterns of the user in the environment.

32. The apparatus of claim 31, wherein logic configured to assign the content priority level based on a history of prior use patterns of the user in the environment comprises at least one of:
logic configured to select a first set of augmented reality contents for display in response to a determination of the user being at work;
logic configured to select a second set of augmented reality contents for display in response to a determination of the user being at home;
logic configured to select a third set of augmented reality contents for display in response to a determination of the user being in a business meeting; and
logic configured to select a fourth set of augmented reality contents for display in response to a determination of the user being in a social event.

33. The apparatus of claim 32, wherein
the first set of augmented reality contents includes application programs for communication and documentation the user is accustomed to use at work; and
the second set of augmented reality contents includes application programs for communication and entertainment the user is accustomed to use at home.

34. The apparatus of claim 33, wherein
the first set of augmented reality contents for communication and documentation includes email, web browser, and office productivity applications; and
the second set of augmented reality contents for communication and entertainment includes social networking websites, movie and video game applications.

35. The apparatus of claim 27, wherein logic configured to assign the content priority level to each content item in a set of augmented reality contents for display with respect to the set of surfaces in the environment comprises:

logic configured to assign the content priority level based on at least one of: scaling factors of the set of augmented reality contents to be displayed, and logical relationships of the set of augmented reality contents to be displayed.

36. The apparatus of claim 27, wherein logic configured to assign the content priority level to each content item in a set of augmented reality contents for display with respect to the set of surfaces in the environment comprises:
   logic configured to assign the content priority level based on predefined user preferences.

37. The apparatus of claim 36, wherein the predefined user preferences comprise at least one of:
   importance of an augmented reality content to the user;
   amount of the augmented reality content to be displayed; and
   viewing orientation of the augmented reality content with respect to the set of surfaces.

38. The apparatus of claim 27, further comprising:
   logic configured to identify a set of markers in the environment;
   logic configured to associate the set of markers with the set of surfaces; and
   logic configured to track the set of surfaces using the set of markers.

39. A system for displaying augmented reality contents, comprising:
   means for receiving, by a camera, a scan of an environment in view of a user;
   means for identifying a set of surfaces in the environment for displaying user interface windows;
   means for prioritizing a set of augmented reality contents for display with respect to the set of surfaces in the environment by assigning a surface priority level to each surface in the set of surfaces, wherein the surface priority level for each surface is selected from a plurality of surface priority levels, assigning a surface trackability level to each surface in the set of surfaces, wherein the surface trackability level for each surface is selected from a plurality of surface trackability levels, and assigning a content priority level to each content item in a set of augmented reality contents for display with respect to the set of surfaces in the environment, wherein the content priority level for each content item is selected from a plurality of content priority levels; and
   means for displaying each content item in the set of augmented reality contents for display on a surface in the set of surfaces in a display based on the surface priority level, the surface trackability level, and the content priority level.

40. The system of claim 39, wherein means for prioritizing a set of augmented reality contents for display with respect to the set of surfaces in the environment comprises:
   means for assigning the surface priority level based on: areas of the set of surfaces, orientations of the set of surfaces, and locations of the set of surfaces relative to field of view of the user, wherein the plurality of surface priority levels include high, medium and low surface priority levels.

41. The system of claim 39, wherein means for prioritizing a set of augmented reality contents for display with respect to the set of surfaces in the environment comprises:
   means for assigning the content priority level based on at least one of: aspect ratio of the set of surfaces with respect to the set of augmented reality contents to be displayed, and background color of the set of surfaces with respect to the set of augmented reality contents to be displayed.

42. The system of claim 39, wherein means for prioritizing a set of augmented reality contents for display with respect to the set of surfaces in the environment comprises:
   means for prioritizing the set of augmented reality contents for display with respect to the set of surfaces in the environment according to a history of prior use patterns of the user in the environment.

43. The system of claim 39, wherein means for prioritizing a set of augmented reality contents for display with respect to the set of surfaces in the environment comprises:
   means for assigning the content priority level based on at least one of: scaling factors of the set of augmented reality contents to be displayed, and logical relationships of the set of augmented reality contents to be displayed.

44. The system of claim 39, wherein means for prioritizing a set of augmented reality contents for display with respect to the set of surfaces in the environment comprises:
   means for prioritizing the set of augmented reality contents for display with respect to the set of surfaces in the environment according to predefined user preferences.

* * * * *